United States Patent [19]

Miller

[11] Patent Number: 5,536,120
[45] Date of Patent: Jul. 16, 1996

[54] TURNING TOOL HOLDER HAVING ROTATABLY ADJUSTABLE CLAMPING MECHANISM

[76] Inventor: Arthur W. Miller, 6202 Farmersville-Germantown Pike, Germantown, Ohio 45327

[21] Appl. No.: 241,401

[22] Filed: May 11, 1994

[51] Int. Cl.⁶ .................................................. B23B 29/04
[52] U.S. Cl. ........................................ 407/105; 407/111
[58] Field of Search ........................ 407/73, 77, 91–94, 407/95, 96, 98, 104–112; 82/160, 161

[56] References Cited

U.S. PATENT DOCUMENTS

| | | | |
|---|---|---|---|
| 3,543,363 | 12/1970 | Diemond . | |
| 3,646,649 | 3/1972 | Oaks et al. | 407/111 |
| 3,683,473 | 8/1972 | Joynson . | |
| 3,889,331 | 6/1975 | Grungras | 29/96 |
| 4,244,666 | 1/1981 | Erickson et al. | 407/105 |
| 4,286,901 | 9/1981 | Eckle | 407/109 |
| 4,334,807 | 6/1982 | Nessel | 407/103 |
| 4,697,963 | 10/1987 | Lück | 407/105 |
| 4,721,422 | 1/1988 | Konwal | 408/233 |
| 4,876,932 | 10/1989 | Nessel | 82/158 |
| 5,035,544 | 7/1991 | Ikenaga et al. | 407/105 |
| 5,100,268 | 3/1992 | Nakayama et al. | 407/104 |
| 5,100,269 | 3/1992 | Lyon et al. | 407/107 |

FOREIGN PATENT DOCUMENTS 2758344  7/1979  Germany ............................. 407/111

*Primary Examiner*—M. Rachuba
*Assistant Examiner*—Kenneth J. Hansen
*Attorney, Agent, or Firm*—R. William Graham

[57] ABSTRACT

A tool holder having an insert comprising a body having a first end adapted for connection to a cutting tool machine and a second end for receiving and clamping the insert. The second end includes an insert receiving surface on which the insert is received. The tool holder includes a clamp rotatably connected to the body adjacent the insert receiving surface, wherein the clamp has means for adjustably rotating the clamp to engage the insert and hold the insert in place.

11 Claims, 4 Drawing Sheets

TURNING TOOL HOLDER HAVING ROTATABLY ADJUSTABLE CLAMPING MECHANISM

FIELD OF THE INVENTION

The present invention relates to a turning tool holder and more particularly, but not by way of limitation, to a turning tool holder having an improved clamping mechanism.

BRIEF DESCRIPTION OF THE PRIOR ART

There exist many tool holders and the like which use a replaceable cutting insert. Such an insert is rigidly secured to the tool by a clamping mechanism. A clamping mechanism will include, for example, a clamp which is brought to bear upon the insert with a force normal to a surface of the insert as it is received in the tool holder. The clamp is typically tightened and held in place by means of a screw pulling the arm down on the insert.

The clamp, however, is continuously under turning forces throughout the cutting process and thus causes loosening of the clamp and insert. Under such forces, a threaded bore in the tool and clamp, which receive the screw, can wear and negatively affect the tool life.

Additionally, the bore itself creates a void in the tool structure negatively affecting its integrity. Loosening of the clamp or inability to maintain its position results in larger variations of part sizes. The amount of force that can be applied to the clamp and the amount of torque which can be applied to the screw without stripping or shearing the same has thus far been relatively limited. Therefore, prior tool holders have been found undesirable and the need exists for a more acceptable turning tool holder.

It is the aim of the present of the invention to overcome the above disadvantages by providing a new turning tool holder which utilizes a relatively simplistic clamping mechanism and achieves relatively high clamping forces through a rotational-type clamping mechanism.

SUMMARY OF THE INVENTION

It is therefore an object of the present invention to provide a tool holder in which the insert can be rigidly fixed thereto using a clamping mechanism which applies force to the insert through its rotational-type movement.

It is another object of the present invention to provide an improved tool holder which has longer life as a result of an improved clamping design.

It is another object of the present invention to provide means for stabilizing a clamp to increase the usefulness and life of a tool holder.

It is a further object of the present invention to provide a turning tool holder which utilizes a unique clamping mechanism to minimize sizing differences between machined parts.

Accordingly, the present invention is directed to a tool holder having an insert comprising of a body having a first end adapted for connection to a cutting tool machine and a second end for receiving and clamping the insert. The second end includes an insert receiving surface on which the insert is received. The tool holder includes a clamp rotatably connected to the body adjacent the insert receiving surface, wherein the clamp has means for adjustably rotating the clamp to engage the insert and hold the insert in place.

The clamp includes a first bore surface extending through it of a predetermined size. The adjustable rotating means includes a screw threadably connected to a threaded bore surface extending through an end of the clamp and able to bear against a surface of the body.

The body further includes a pair of lugs adjacent the insert receiving surface which are laterally spaced from one another. Each lug has a bore surface extending therethrough of a predetermined diameter slightly less than the width of the first bore surface of the clamp, wherein the lugs are positioned such that the bore surfaces are co-axial. The clamp is disposed between the lugs such that the clamp's first bore surface is generally co-axial with the lug bore surfaces. The tool includes a bearing pin of slightly less diameter than the bore surface diameter and is positioned within the bore surfaces of the clamp and the lugs. The first bore surface of the clamp and bearing pin have a flat surface portion which mate to one another to permit a sliding or translational movement. The flat of the bore surface is set at a predetermined angle with respect to the bearing surface to effect rotation of the clamp when the screw is threaded through the threaded bore surface and brought to bear against the bearing surface.

DETAILED DESCRIPTION OF PREFERRED EMBODIMENT

Figure 1:
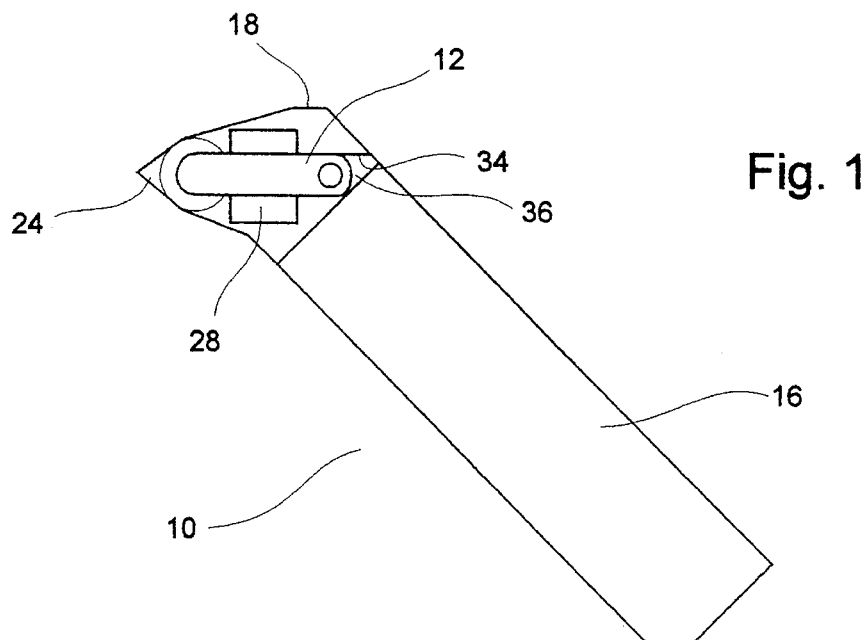
FIG. 1 is a plan view of the turning tool holder in accordance with an embodiment of the present invention.
Figure 2:
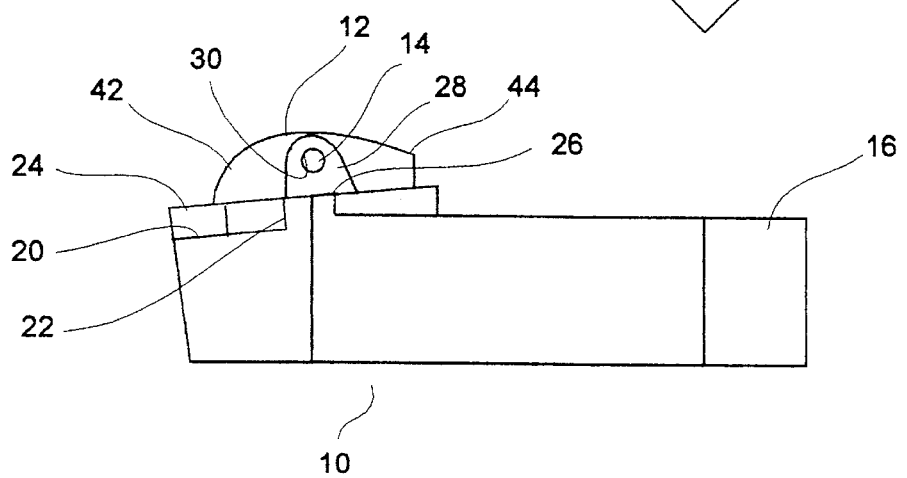
FIG. 2 is a side view of the turning tool holder of FIG. 1.

Referring to FIGS. 1–6 in the preferred embodiment of the present invention, the turning tool holder comprises of a tool body 10, clamp 12 and bearing pin 14. The body 10 has a rear-end 16 which is adapted for connection to a turning machine. The body 10 has an operative end 18 which includes an insert receiving surface 20 and an insert side wall receiving surface 22 which together form a pocket to receive an insert 24. The surface 20 can be pitched to a desired angle of cutting for negative inserts or not pitched for positive inserts as is known in the art.

Rearwardly disposed from the side wall receiving surface 22 and extending upward a predetermined height from a top surface 26 are a pair of support members or lugs 28. The lugs 28 are laterally spaced from one another and each include a bore surface 30 which are co-axial with one another and are of a substantially the same size and diameter. The lugs 28 can be of a size and shape to accommodate a particular insert or application, i.e. turning, boring or milling. Rearwardly displaced from side wall receiving surface 22 and between lugs 28 is formed in the top surface 26 a recess 32 which is bound by a bearing surface 34 and surfaces 36.

The clamp 12 is disposed between lugs 28. The clamp 12 includes a front-end 42 and rear-end 44 and is characterized to have a top surface 46 which is generally arcuate and spanning from end 42 to end 44. The front-end 42 includes a nose pin 48 which is shaped to aid in locating and retaining the insert 24 through an insert bore surface 50. In this regard, the nose pin 48 is formed with a slightly tapered surface 52 to aid in its insertion upon rotation of the clamp 12. The clamp 12 is of a width which is toleranced slightly less than the distance between lugs 28 to maintain and stabilize position of the clamp 12 and insert 24 during the machining process.

Figure 3:
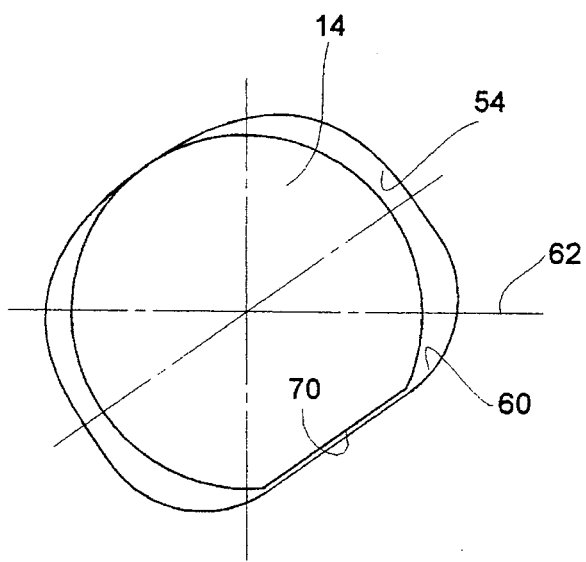
FIG. 3 is an enlarged cross-section of a clamp bore surface and a bearing pin within the turning tool holder of FIG. 1.
Figure 4:
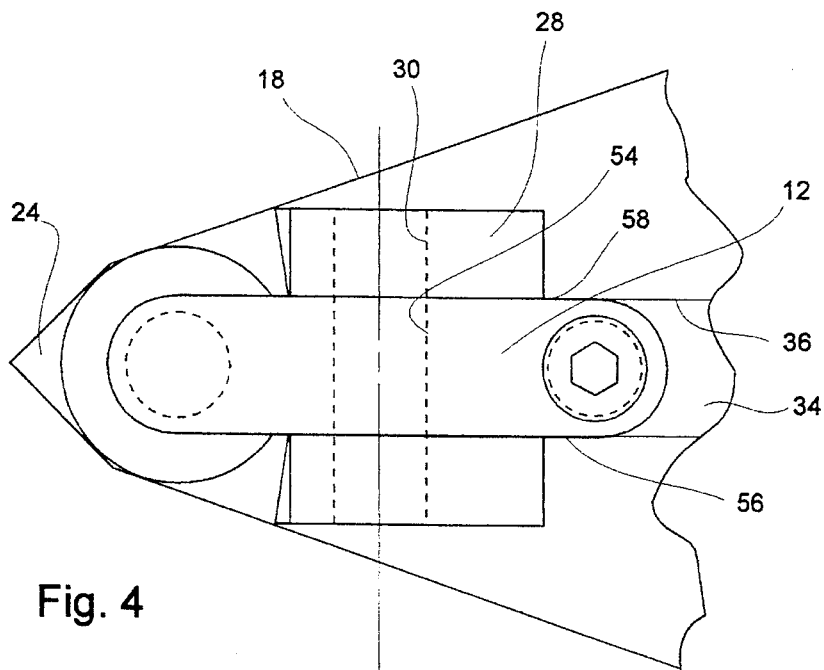
FIG. 4 is an enlarged sectional view of a head of the turning tool holder of FIG. 1.
Figure 5:
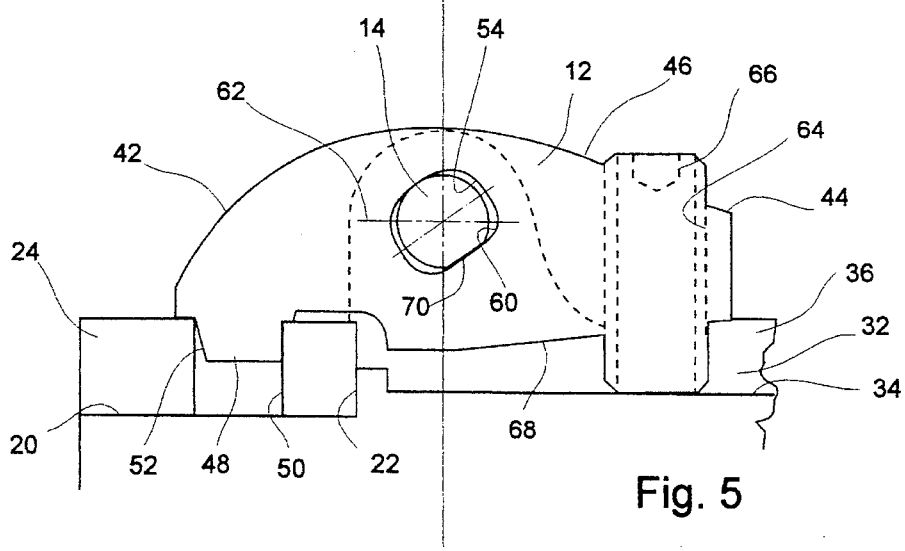
FIG. 5 is a cross-sectional view of the head of the turning tool of FIG. 1.
Figure 6:
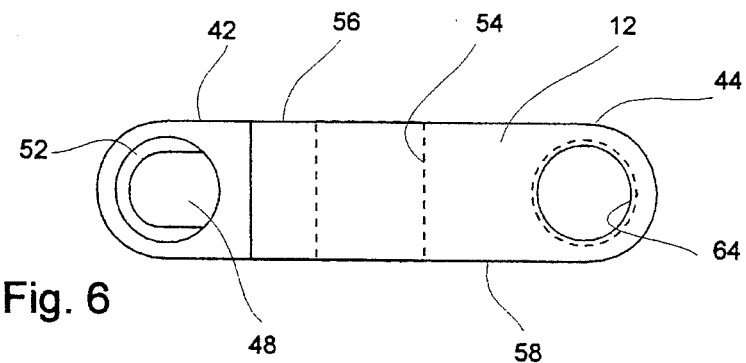
FIG. 6 is a plan view of the clamp of the turning tool holder of FIG. 1.
Figure 7:
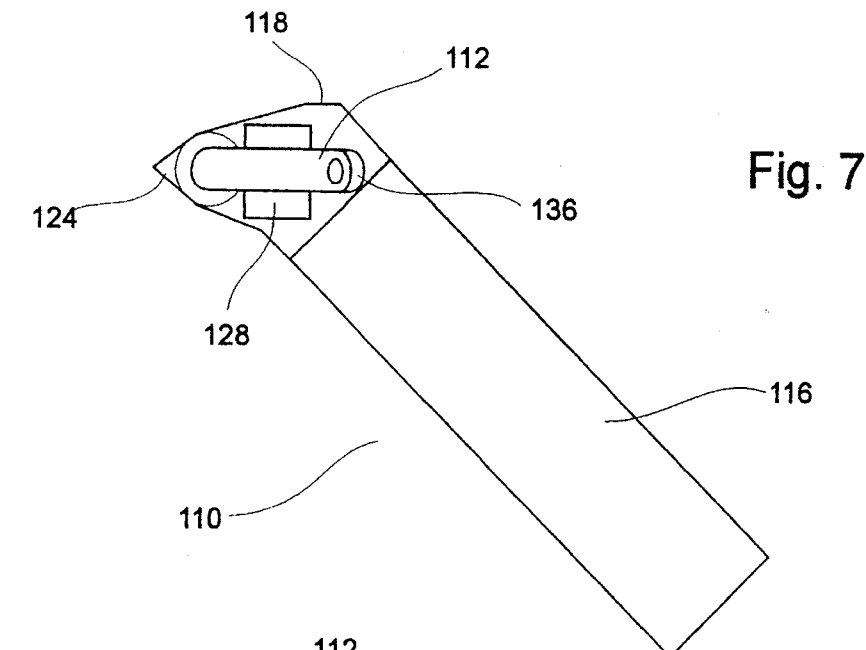
FIG. 7 is a plan view of another embodiment of the turning tool holder in accordance with the present invention.
Figure 8:
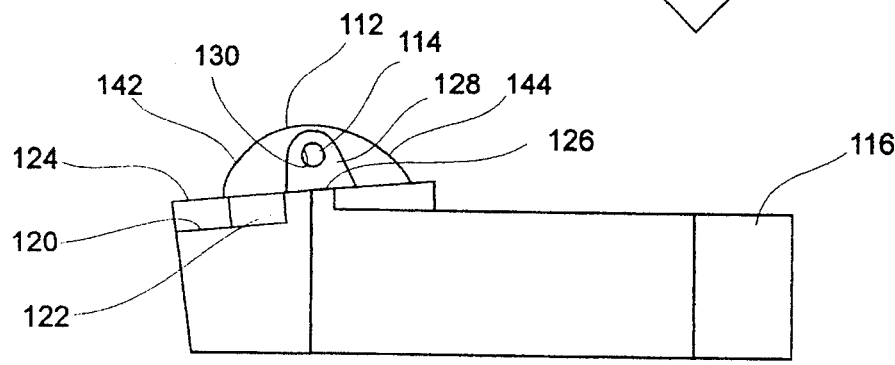
FIG. 8 is a side view of the turning tool holder of FIG. 7.
Figure 9:
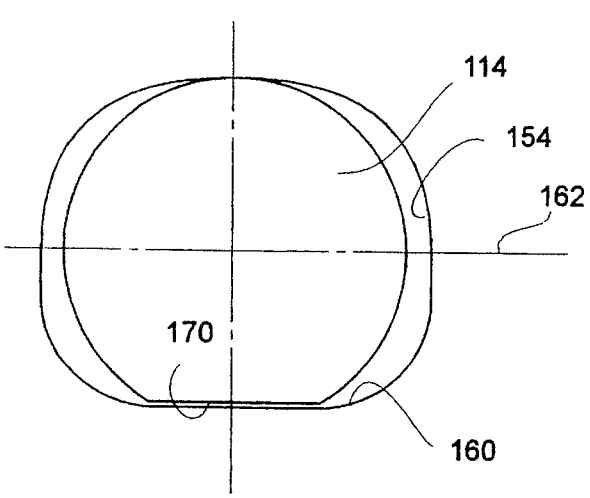
FIG. 9 is an enlarged cross-section of a clamp bore surface and a bearing pin within the turning tool holder of FIG. 7.
Figure 10:
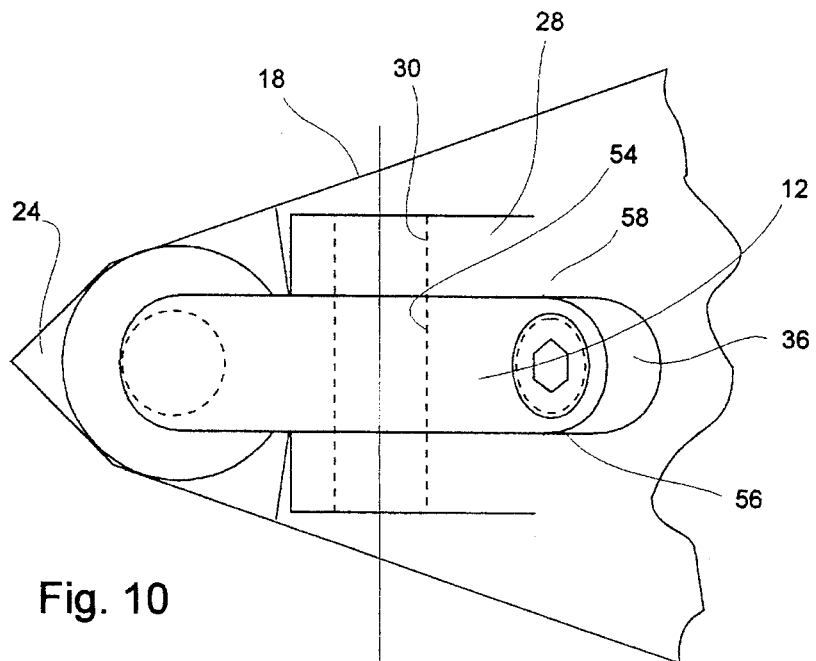
FIG. 10 is an enlarged sectional view of a head of the turning tool holder of FIG. 7.
Figure 11:
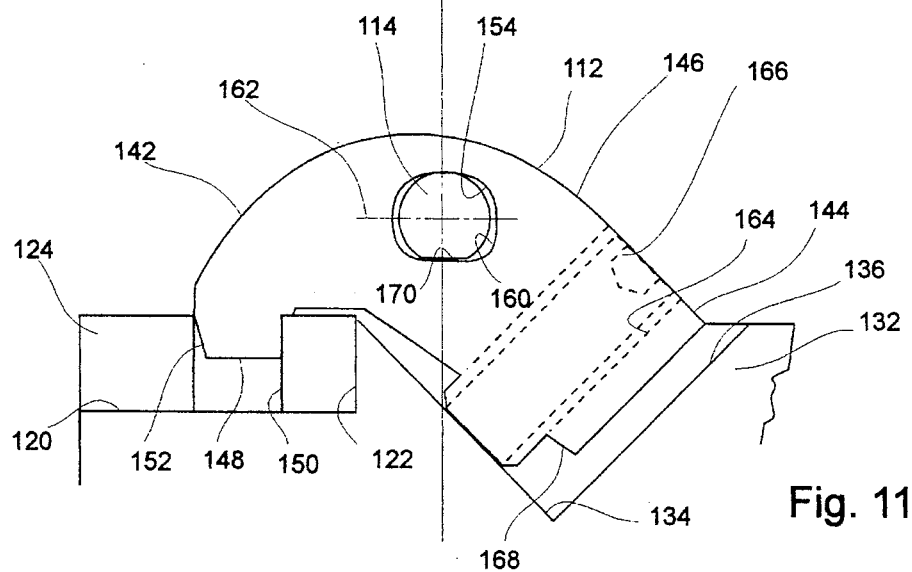
FIG. 11 is a cross-sectional view of the head of the turning tool of FIG. 7.
Figure 12:
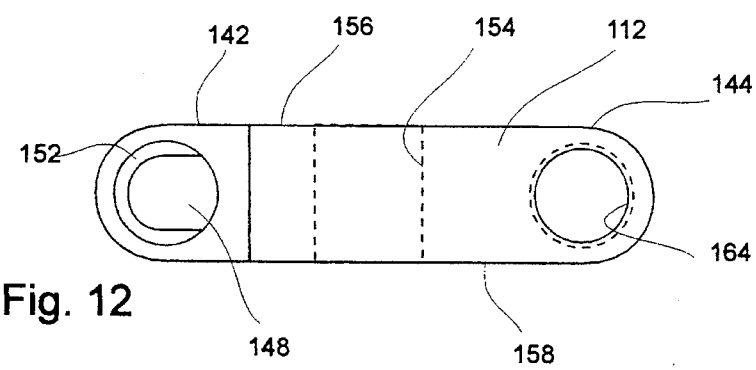
FIG. 12 is a plan view of the clamp of the turning tool holder of FIG.7.

The clamp 12 has a bore surface 54 extending from one side 56 through to another side 58. The bore surface 54 is further characterized to have a flat surface 60 extending the length of the bore surface 54. It should be noted that the bore surface 54 is of a slightly greater width than the bore surfaces 30 and diameter of the pin 14 and is relatively elliptical in shape. The flat surface 60 is pitched with respect to a horizontal axis 62 of the clamp 12 and bearing surface 34. As shown in FIGS. 3 and 5, the flat surface 60 is tilted approximately 30 degrees with reference to axis 62. This angle can vary to suit a particular insert or application.

The rear-end 44 of the clamp 12 includes a threaded aperture surface 64 and receives a threaded screw 66 thereagainst which is capable of being threaded through the end 44. The threaded bore surface 64 is set normal to surface 34. A bottom surface 68 of the clamp 12 is made to taper toward end 44 for greater rotational clearance. It should be noted, however, that the clamp should maintain sufficient thickness in material below the surface 60 to retain integrity of the clamp 12. Rather than tapering end 44, it is contemplated that surface 34 could be formed to allow for greater rotational clearance as is shown in the alternative embodiment in FIGS. 7–12.

The bearing pin 14 extends through bore surfaces 30 and 54. Pin 14 also has a flat surface 70 which, when positioned within bore surface 54, prevents rotational movement, but allows translational movement therein. The pin 14 is rotatably disposed within the bore surfaces 30. A distance taken across the flat surface 60 of the clamp bore surface 54 is slightly greater than a thickness of the pin 14 taken across the flat surface 70 and a distance taken across a midpoint of the clamp bore surface 54 generally parallel to the flat surface 60 is greater than a diameter of the pin 14 to allow only for the translational movement therebetween. The lug bore surfaces 30 are of a diameter slightly greater than the pin 14 diameter to permit the rotation thereagainst.

To ready the tool holder, the screw 66 is threaded into the threaded bore surface 64 a distance not to protrude beyond surface 68 or interfere with the end's 44 ability to rotate toward the bearing surface 34. This allows for the end 42 to sufficiently displace from the surface 20 so that the insert 24 can be placed onto the receiving surface 20 and against the surface 22 without interference of the nose 48 of the clamp 12. The nose 48 is then pushed into the bore surface 50 to locate the insert 24. The screw 66 is threaded through the end 44 to bear upon surface 34. As threading proceeds, a rotational force component is applied to the clamp 12 which causes the clamp 12 to slide on the flat 70 of the pin 14. This sliding or drawing of the clamp 12 in turn places a rearward force component by the nose 48 on the insert 24 to seat the insert 24 against the wall 22. Also, there is applied a downward force component on the insert 24 as the threading continues which results from the clamp 12 and bearing pin 14 rotating on lug bore surfaces 30.

FIGS. 7–12 disclose an alternative embodiment. In operation and structure, the embodiment shown in FIGS. 7–12 is similar to that described for the embodiment shown in FIGS. 1–6. A primary difference resides in a clamp 112, recess 132 and defining surfaces 134 and 136. Here, the clamp 112 is more arcuate with the recess 132 being deeper resulting in the bearing surface 134 being pitched with respect to a horizontal axis 162. Again, the end 144 is formed with a threaded bore surface 164 normal to the surface 134. The flat surface 160 of the bore surface 154 is generally parallel to the axis 162. As a screw 166 is threaded through a bore surface 164 and brought to bear upon surface 134, the clamp 112 rotates and moves rearwardly by sliding on a pin 114, wherein the nose 148 firmly seats the insert 124 against a wall 122. Further threading causes a downward force to be applied to the insert 124 through a rotational force as the clamp 112 and pin 114 rotate on lug bore surfaces 130.

By so providing the tool holder as shown in the accompanying drawings and discussed in the description above, a unique clamping mechanism is achieved which allows for increased forces to be applied to retain the insert in place without affecting the integrity of the tool head. More particularly, a rearward force component is generated to seat the insert against the insert side wall receiving surface and a greater downward force component is generated through rotational force. Additionally, the body provides means for stabilizing the clamp and minimizing the amount of wear on the clamp screw and bearing surface.

The turning tool holder of the present invention, therefore, provides for lower variations between machined parts over the life of the tool. Additionally, by virtue of the clamping mechanism and stabilizing means, there is provided a turning tool holder with improved life.

The present invention has been disclosed above in the preferred embodiments. However, there exists to those skilled in the art many modifications, derivations and improvements which will be readily apparent upon reading the disclosure and viewing the drawings herewith. For example, other insert geometries will dictate the clamp and lug configuration without deviating from the principles of operation of the invention disclosed herein. Accordingly, the present invention and claims appended hereto should be accorded the full scope of protection of such modifications, derivations and improvements.

What is claimed is:

1. A turning tool having an insert, comprising:
   a body having a first end adapted for connection to a turning tool machine and a second end for receiving and clamping the insert, said second end including an insert receiving surface on which the insert is received, said body further including a pair of lugs adjacent said insert receiving surface and laterally spaced from one another, each lug having a bore surface therethrough of a predetermined diameter, said lugs positioned such that said bore surfaces are co-axial; and
   a clamp rotatably connected to said body adjacent said insert receiving surface, said clamp having means for adjustably rotating said clamp to engage the insert in place and wherein said clamp includes a bore surface therethrough of a predetermined diameter having a flat surface portion along the surface thereof, said clamp being disposed between said lugs such that said clamp bore surface is generally co-axial with said lug bore surfaces, and further including a bearing pin having a flat surface portion, said pin extending through said lug bore surfaces and said clamp bore surface such that said flat surface of said pin is positioned adjacent said flat surface portion of said clamp bore surface.

2. The turning tool holder of claim 1, wherein said adjustable rotating means includes a screw threadably connected to a threaded bore surface extending through an end of said clamp able to bear against a surface portion of said body to effect rotation of said clamp when said screw is threaded through said threaded bore surface against said bearing surface.

3. The turning tool holder of claim 2, wherein said clamp end is slightly tapered.

4. The turning tool holder of claim 2, wherein said body further includes a recess defined in part by said bearing surface in which said end of said clamp is movably disposable.

5. The turning tool holder of claim 1, wherein said body further includes a recess between said lugs defined by said bearing surface and another surface in which said end of said clamp is movably disposable.

6. The turning tool holder of claim 1, wherein said flat surface of said first clamp bore surface is set at a predetermined angle and is pitched relative to said bearing surface.

7. The turning tool holder of claim 6, wherein a distance taken across said flat surface portion of said first clamp bore surface is slightly greater than a thickness of said pin taken across said flat surface portion of said pin, and wherein a distance taken across a midpoint of said clamp bore surface generally parallel to said flat surface of said clamp bore surface is greater than a diameter of said pin to allow only for translational movement therebetween, and wherein said diameter of said lug bore surfaces are slightly greater than said pin diameter to permit rotation thereagainst.

8. The turning tool holder of claim 1, wherein said clamp is further characterized to be connected to said body in a manner to allow predetermined translation movement such that when said clamp is rotated, said clamp translationally moves and applies a rearwardly seating force to the insert.

9. The turning tool holder of claim 1, wherein said clamp is further characterized to be connected to said body in a manner to allow a predetermined translation movement such that when said clamp is rotated, said clamp translationally moves and applies a rearward seating force to the insert prior to complete downward force applied to the insert through said clamp rotation.

10. The turning tool holder of claim 1, wherein an end of said clamping is further characterized to include a positioning nose having a tapered surface portion to enable clearance of said nose when positioning within a pocket formed in the insert.

11. The turning tool holder of claim 1, wherein said flat surface of said clamp is set at a predetermined angle with respect to said bearing surface so that said clamp is translationally movable and rotatable as said screw is threaded to bear upon said bearing surface.

* * * * *